United States Patent [19]

Nakano et al.

[11] Patent Number: 4,742,281
[45] Date of Patent: May 3, 1988

[54] SPEED CONTROL APPARATUS FOR A DC MOTOR

[75] Inventors: Hiromitsu Nakano, Hirakata; Mitsuru Yamane, Katano; Isao Yoshida, Suita, all of Japan

[73] Assignee: Matsushita Electric Industrial Co., Ltd., Kadoma, Japan

[21] Appl. No.: 796,407

[22] Filed: Nov. 8, 1985

[30] Foreign Application Priority Data

Nov. 12, 1984 [JP] Japan .................. 59-237812
Nov. 12, 1984 [JP] Japan .................. 59-237814

[51] Int. Cl.[4] ............... G05G 5/00; H02P 5/00
[52] U.S. Cl. ..................... 318/317; 330/69; 330/257; 323/313; 323/901; 318/345 B; 318/331
[58] Field of Search ............ 318/317, 345 B, 331, 318/626, 345 F, 460; 330/69, 252, 256, 257; 323/311, 312, 313, 314, 315, 316, 317, 900; 307/362, 355, 350, 354

[56] References Cited

U.S. PATENT DOCUMENTS

| | | | |
|---|---|---|---|
| 3,560,828 | 2/1971 | Kobayashi et al. | 318/332 |
| 3,932,768 | 1/1976 | Takahashi | 330/257 |
| 4,047,119 | 9/1977 | Ohmura | 330/69 |
| 4,088,962 | 5/1978 | Trilling | 330/69 |
| 4,249,122 | 2/1981 | Widlar | 323/313 |
| 4,319,180 | 3/1982 | Nagano | 323/313 |
| 4,345,189 | 8/1982 | Kukaya | 318/317 |
| 4,380,728 | 4/1983 | Kearney | 323/281 |
| 4,396,883 | 8/1983 | Holloway | 323/313 |
| 4,427,931 | 1/1984 | Tsukihashi | 318/317 |
| 4,447,784 | 5/1984 | Dobkin | 323/313 |
| 4,477,752 | 10/1984 | Nakano | 318/317 |
| 4,495,429 | 1/1985 | Oda | 330/257 |
| 4,532,479 | 7/1985 | Blauschild | 330/252 |
| 4,590,419 | 5/1986 | Moriarty | 323/313 |
| 4,610,001 | 9/1986 | Ong | 330/252 |

FOREIGN PATENT DOCUMENTS

| | | |
|---|---|---|
| 0024151 | 2/1981 | European Pat. Off. . |
| 0104752 | 4/1984 | European Pat. Off. ........... 323/313 |
| 0075221 | 4/1984 | European Pat. Off. . |
| 2821425 | 11/1978 | Fed. Rep. of Germany . |
| 2008807 | 6/1979 | United Kingdom . |
| 2095433 | 9/1982 | United Kingdom . |

OTHER PUBLICATIONS

Patent Abstracts of Japan, vol. 7, No. 136 (E–181) (1281), Jun. 14, 1983.
Electronique et Microelectronique Industrielles, No. 162, Oct. 15, 1972, Paris, France, (C. Boisard).

Primary Examiner—William M. Shoop, Jr.
Assistant Examiner—Patrick C. Keane
Attorney, Agent, or Firm—Cushman, Darby & Cushman

[57] ABSTRACT

A speed control apparatus for a DC motor operable with a low voltage battery has a reference voltage generating circuit capable of operable with a low voltage such as 1 V and is settable for output voltage and for temperature coefficient independently each other and has a differential amplifier which is operable with a very small input voltage and capable of operable with such a low voltage.

18 Claims, 4 Drawing Sheets

SPEED CONTROL APPARATUS FOR A DC MOTOR

FIELD OF THE INVENTION AND RELATED ART STATEMENT

1. Field of the Invention

The present invention relates generally to a speed control apparatus for a DC motor, and more particularly, to a speed control apparatus for a DC motor of small type to be operated by a low voltage battery.

2. Description of the Related Art

As an example of the conventional speed control apparatus for a DC motor, there is Japanese unexamined published patent application No. Sho 57-153583. As a reference voltage generation circuit to be used for the speed control apparatus shown in the conventional art, for instance, a band-gap reference voltage generation circuit as shown in pages 1, 6–7 in a "Voltage regulator handbook" published by Seibundo-Shinkohsha on May 10, 1979.

Now, the speed control apparatus for a DC motor of the prior art is described with reference to FIG. 3 which shows the prior art disclosed in the above-mentioned publication.

In FIG. 3, a DC motor 1, a resistor 2, a resistor 3, and a resistor 4 together constitute a known bridge circuit, wherein across its two voltage-feeding points "d" and "e" a voltage from a battery 26 is impressed through a current controlling transistor 25, and two junction points "a" and "b" which are voltage detection points of the bridge circuit. A reference voltage source 5 is connected by one end to the voltage detection point "a" and by the other end to the base of a transistor 19 of a differential amplifier 23. Common-connected emitters of the transistor 19 and another transistor 20 of the differential amplifier 23 are impressed with a DC voltage from the power source 26 through an emitter-collector circuit of a transistor 18. An emitter-collector circuit of another transistor 17 and a constant current circuit 16 are connected in series across both ends of the voltage source 26, and the collector and base of the transistor 17 and the base of the transistor 18 are connected in common, to constitute a current mirror circuit. The base of the transistor 20 is connected to the voltage detection point "b" of the bridge circuit. The collectors of the transistors 19 and 20 are connected, respectively, to the collectors of the transistors 21 and 22, which constitute a current mirror circuit, and the base of the transistor 21 is connected to the collector thereof, and connected to the base of the transistor 22, and their emitters are connected in common to a negative line 28 of the power source 26. A transistor 24 is connected by its base to the collectors of the transistors 20 and 22, and by the collector to the base of the current controlling transistor 25 and by the emitter to the negative line 28.

The operation of the above-mentioned conventional speed control apparatus for a DC motor is as follows. Now, defining the equivalent internal resistance of the DC motor 1 as $R_1$ and the resistances of the resistors 2, 3 and 4 as $R_1$, $R_2$ and $R_3$, when the following equilibrium condition of the bridge is held:

$$R_1 \cdot R_2 = R_3 \cdot R_a \qquad (1),$$

the output voltage across the voltage detection points "a" and "b" depends solely on the rotation speed of the motor 1, and is not dependent on the load torque, namely, armature current $I_a$. Accordingly, by amplifying a difference of the detected voltage and a reference voltage $V_{ref}$ by the differential amplifier 23, by further amplifying the output by the transistor 24, and by controlling the base potential of the current controlling transistor 25 by the output of the transistor 24, the rotation speed of the DC motor 1 is controlled in a manner that when the rotation speed is higher than a predetermined rotation speed, a current I to be fed to the bridge circuit is decreased, and, on the contrary, when the rotation speed is lower than a predetermined rotation speed, the current I is increased, thus to maintain the rotation speed at a substantially constant speed.

The reference voltage source 5 of the conventional apparatus of FIG. 3 is, for instance, constituted as shown in FIG. 4, wherein a constant current circuit 8, a resistor 6 and a collector-emitter circuit of a transistor 7 is connected in series across a positive voltage source terminal 27 and a negative voltage source "a" of the circuit of FIG. 3. The base of the transistor 7 is connected to its collector. A junction point between the constant current circuit 8 and the resistor 6 is connected to an output terminal 10 of this reference voltage source circuit 5. A resistor 13, a collector-emitter circuit of a transistor 11 and a resistor 12 are connected in series across the output terminal 10 and the negative terminal "a", and the base of the transistor 11 is connected to the collector of the transistor 7. A transistor 14 is connected by the base to the collector of the transistor 11 and by the collector to the output terminal 10 and by the emitter to the negative terminal "a". The transistor 11 is designated to operate with a smaller emitter current density than that of the transistor 7, so that by adding a positive temperature coefficient of the voltage difference $\Delta V_{BE}$ between the base-emitter voltages of the transistor 7 and the transistor 11 to a negative temperature coefficient of the base-emitter voltage $V_{BE14}$ of the transistor 14, a predetermined temperature coefficient is obtainable in the reference voltage $V_{ref}$ issued from the output terminal 10. The output reference voltage $V_{ref}$ is represented as follows:

$$V_{ref} = V_{BE14} + \frac{\Delta V_{BE}}{R_{12}} \cdot R_{13} + I_{B14} \cdot R_{13}, \qquad (2)$$

wherein $R_{12}$ and $R_{13}$ are resistances of the resistors 12 and 13, $I_{B14}$ is base current of the transistor 14. By neglecting the voltage drop across the resistor 13 due to the the base current $I_{B14}$ since the base current $I_{B14}$ is small, the reference voltage $V_{ref}$ is given as follows:

$$V_{ref} = V_{BE14} + \frac{R_{13}}{R_{12}} \cdot \frac{kT}{q} \ln \frac{J_7}{J_{11}}, \qquad (3)$$

wherein "q" is charge of electron, "k" is Boltzman constant, T is absolute temperature, and $J_7$ and $J_{11}$ are emitter current densities of the transistors 7 and 11, respectively.

Fluctuation of the reference voltage $V_{ref}$ due to variation a of ambient the temperature T is given from the equation (3) as follows:

$$\frac{\Delta V_{ref}}{\Delta T} = \frac{\Delta V_{BE14}}{\Delta T} + \frac{R_{13}}{R_{12}} \cdot \frac{k}{q} \ln \frac{J_7}{J_{11}}. \qquad (4)$$

Now, provided that
$V_{BE14} = 0.71$ V,
$R_{12} = 500\Omega$,
$R_{13} = 5$ k$\Omega$,
$J_7/J_{11}32$ 10 and
$T = 298°$ K. (25° C.),
then, the reference voltage $V_{ref}$ becomes $V_{ref} = 1.30$ V, and provided that $$\frac{\Delta V_{BE14}}{\Delta T} = -2mV/C°,$$

from the equation (4)

$$\frac{\Delta V_{ref}}{\Delta T} = 0.$$

That is, output of the reference voltage of the conventional speed control apparatus for the DC motor shown in FIG. 4 with temperature compensation is about 1.3 V, and this value does not change substantially.

However, when the above-mentioned constitution is used in an electronic apparatus, such as a small type tape-recorder, and it is operated by a single dry battery of about 1.5 V (which outputs only about 1 V at the end of its service life), the reference voltage source 5 can not operate when the voltage of the power source, such as the dry battery, becomes low. Furthermore, even when the power source voltage is in its normal state, the output voltage of the reference voltage source 5 is always fixed at about 1.3 V, and independent adjustments of the outputs voltage and the temperature coefficient of it have not been possible, and freedom of design has been small.

The conventional speed control apparatus of FIG. 3 has still other problem. That is, if the condition would be that an improvement of the reference voltage source 5 could be attained and the output voltage of the reference voltage source 5 with temperature compensation would be selected as a smaller value, the potential of the output terminal 10 of the reference voltage source 5, namely, the potential of the input terminal of the differential amplifier 23, hence the base potentials of the transistors 19 and 20 are of a smaller value. Therefore, the emitter potentials of the transistors 19 and 20 would become substantially equal to the base-emitter voltages of the transistors 19 and 20. Then, on the other hand, the collector potential of the transistor 19 would be substantially equal to the base emitter voltages of the transistors 21 and 22, and the collector potential of the transistor 20 would be the base-emitter voltage of the transistor 24. Therefore, when the states of the transistors 19 and 20 would be ON, the emitter-collector voltages of the transistors 19 and 20 would become very small value, so these transistors would become saturated and could not feed current from their collectors to the transistors 21, 22, or 24, and resultantly the operation of the differential amplifier 23 would become unstable. The situation is elucidated further in detail by taking one actual example. For instance, taking one example of a small cassette tape-recorder which is operated by a single dry battery and which uses the speed control apparatus of FIG. 3 and FIG. 4, and in the bridge circuit the equivalent internal resistance $R_a$ is $R_a = 2.8\Omega$, back EMF constant Ka is Ka$= 2.5 \times 10^{-4}$ V/rpm and the like condition is used. Now, in the speed control apparatus of FIG. 3, when the bridge equilibrium condition shown in equation (1) is held, the controlled revolution speed N is given by:

$$N = \frac{1}{K_a} \cdot \frac{R_2 + R_3}{R_3} \cdot V_{ref}. \quad (5)$$

Now provided that N=2200 rpm, the ratio of the resistance is $R_2:R_3 = 10:1$, and the reference voltage $V_{ref}$ becomes 0.05 V. Furthermore, since the ratio of resistance is $R_2:R_3 = 10:1$, the resistance $R_1$ of the resistor 2 is $0.28\Omega$, and, accordingly, when the rated load current of the DC motor 1 is 65 mA, the voltage drop across the resistor 2 under the controlling for the rated load becomes about 0.018 V. Accordingly, the base potential of the transistor 19, which is given as a sum of the voltage drop across the resistor 2 and the reference voltage $V_{ref}$ becomes such a small value of 0.068 V. Furthermore, when controlling of the speed is made at a rotation speed of 2200 rpm, a voltage $V_{de}$ across the positive and negative voltage feeding points "d" and "e" of the bridge circuit of FIG. 3 is given as follows:

$$V_{de} = E_a + (R_a + R_1) \cdot I_a \quad (6)$$

$$= K_a \cdot N + (R_a + R_1) \cdot I_a \quad (7)$$

$$= 2.5 \times 10^{-4} \times 2200 + (2.8 + 0.28) \times 65 \times 10^{-3}$$

$$= 0.75 \text{ V}. \quad (8)$$

Therefore, the base potential of the transistor 20 becomes a voltage given by dividing the voltage $V_{de}$ by the resistances of the resistor 3 and resistor 4, and becomes about 0.068 which is almost equal to that of the transistor 19. That is, in the case of speed a control apparatus for such a small DC motor, because the back EMF constant is small, the base potentials of the transistors 19 and 20 become as small as 0.068 V and the transistors 19 and 20 become saturated, thereby making the normal operation of the differential amplifier 23 impossible, and satisfactory control of the rotation speed of the DC motor can not be attained.

Furthermore, there has been a problem that in the conventional speed control apparatus for a DC motor having a small EMF constant, there is a possibility that the input offset voltage of the differential amplifier 23 gives undesirable mal-effect for control of the revolution speed since the reference voltage is small responding to the back EMF constant, and such case is elucidated in detail. Let us define that under the controlled state, the base currents of the transistors 21 and 22 are respectively $I_b$, the collector currents of respective transistors 21 and 22 are $I_c$, and the base current of the transistor 24 is $I_B$, then the collector current of the transistor 19 becomes $I_c + 2I_b$, and the collector current of the transistor 20 becomes $I_c + I_B$. In general, since there is a difference between the collector currents of the transistors 19 and 20, emitter-base voltages of the transistors 19 and 20 become different from each other, and such difference exists as input offset voltage. Furthermore, since there is a difference between the base-emitter voltage of the transistor 21 or that of the transistor 22, and further that of the transistor 24, a voltage difference arises between the emitter-collector voltages of the transistors 19 and 20, and these two transistors make difference of operation and this also may cause input offset voltage. In other words, in case of the operation by a low voltage source, since the emitter-collector voltages of the transistors 19 and 20 are not sufficient, their operation is undesirably near their saturation regions. Accordingly, only a small difference of the emitter-collector voltages causes difference of characteristics such as the current amplification factor of the transistors 19 and 20, hence input offset voltage. Such an input offset voltage is usually only about several mV, but in the case of controlling the abovementioned a small DC motor having small back EMF constant, the existence of the input offset voltage against the reference voltage can not be neglected. That is, a temperature characteristic or a voltage characteristic (input offset voltage of the transistors 19 and 20 is influenced by Early effect of the transistor 18 due to the change of source voltage that causes resultant change of collector current) undesirably effect the speed controlling ability for the DC motor 1. As has been explained, in the conventional speed control apparatus for a DC motor, in case voltage drops across the resistors 2 and 4 are small, for instance, when the load torque of the DC motor is small and the armature current $I_a$ is small or when the speed control apparatus for the DC motor is driven by only one dry battery and only low voltage is impressed between the voltage feeding points "d" and "e", stable control of the DC motor has not been possible.

SUMMARY OF THE INVENTION

The purpose of the present invention is to provide an improved speed control apparatus for a DC motor wherein a reference voltage circuit may be selected with a considerable freedom of variations of output reference voltage and adjustment against temperature change and having very small variation of its reference voltage against a change in voltage of the voltage source and capable of operation by a power source of low voltage, and having a differential amplifier of veri small input offset voltage, and also capable of operating by small input signals.

The above-mentioned purpose of the present ivention is accomplished by a speed control apparatus for a DC motor comprising:

a bridge circuit for generating a voltage proportional to the speed of rotation of the DC motor across voltage output points, the bridge circuit including three arms besides the DC motor;

a first transistor and a second transistor operated with each other different emitter current densities;

constant voltage generating means for issuing a sum of a difference voltage between base-emitter voltages of the first transistor and the second transistor and a voltage made by dividing the base-emitter voltage of the second transistor;

reference voltage generating means for generating a reference voltage as a function of output of the constant voltage generating means;

a differential amplifier for amplifying and issuing difference of the voltage across the voltage output points and the reference voltage, and current control means for controlling current to be fed to the bridge circuit as a function of the voltage across the voltage output points and the reference voltage, thereby to control current to the DC motor in the bridge circuit.

According to the above-mentioned constitution, by summing the voltage made by dividing the base-emitter voltage of one of the two transistors with the difference voltage between the base-emitter voltages of the two transistors, a summed output voltage of as small as, for instance, about 150 mV is obtainable. Moreover, as a result of combining a positive value temperature coefficient of difference voltage of the base-emitter voltages of the above-mentioned two transistors with a negative value temperature coefficient of the divided voltage of the base-emitter voltage of the above-mentioned one transistor, a desired temperature coefficient is obtainable for an output of the constant voltage generating means; and therefore, a reference voltage circuit which is stably operable even for a source voltage of only 1 V.

By constituting the circuit in such a manner that the collector potential of the second transistor is clamped by the emitter-base voltage of the transistor, the collector potential is maintained almost constant irrespective of fluctuation of the source voltage, and hence the second transistor can work substantially free from the undesirable Early effect, and thereby the voltage characteristic of the output is much improved.

Besides, by providing first current feeding means and second current feeding means, each made by a collector-emitter path of a transistor for said first transistor and said second transistor, respectively, the temperature characteristic and output voltage level of the reference voltage source become independently selectable with a certain freedom.

DESCRIPTION OF THE PREFERRED EMBODIMENTS

Figure 1:
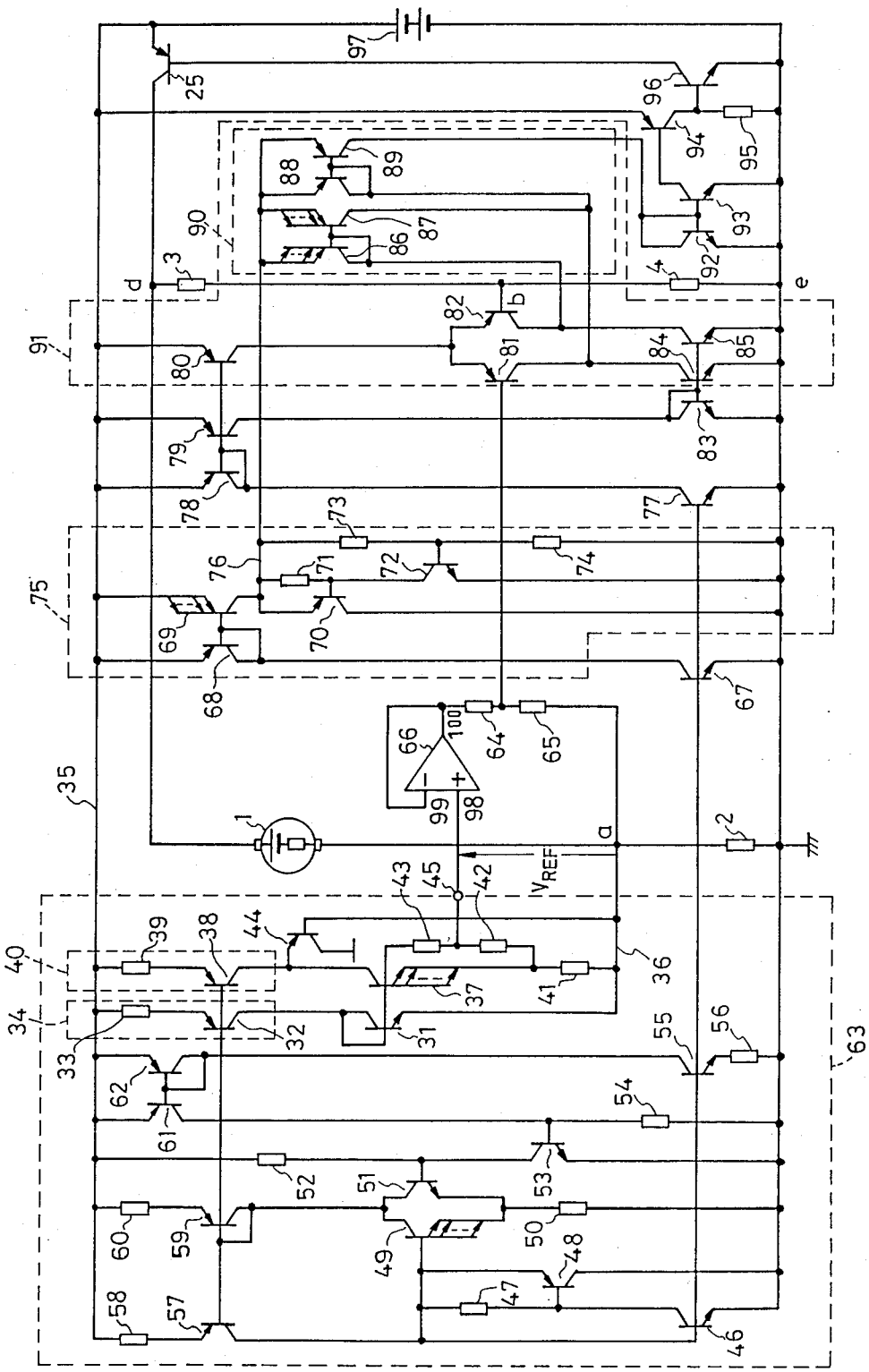
FIG. 1 is a circuit diagram showing a speed control apparatus for a DC motor embodying the present invention.
Figure 2:
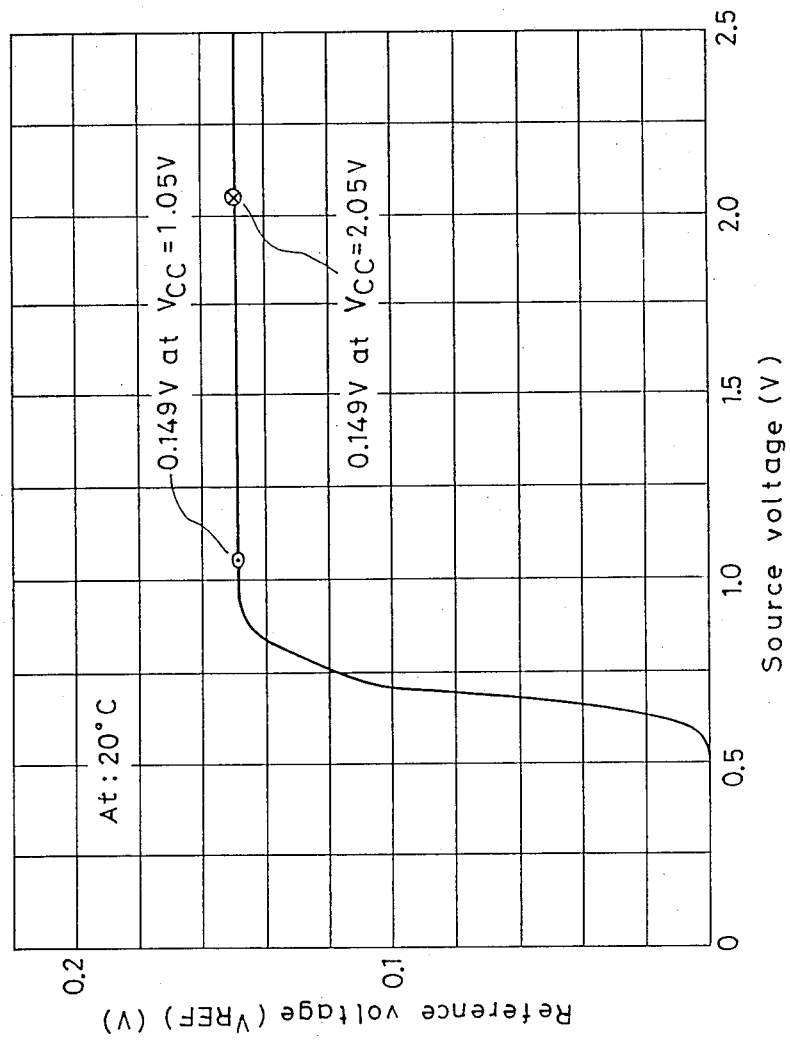
FIG. 2 is a characteristic curve showing the characteristic of the embodiment shown in FIG. 1.
Figure 3:
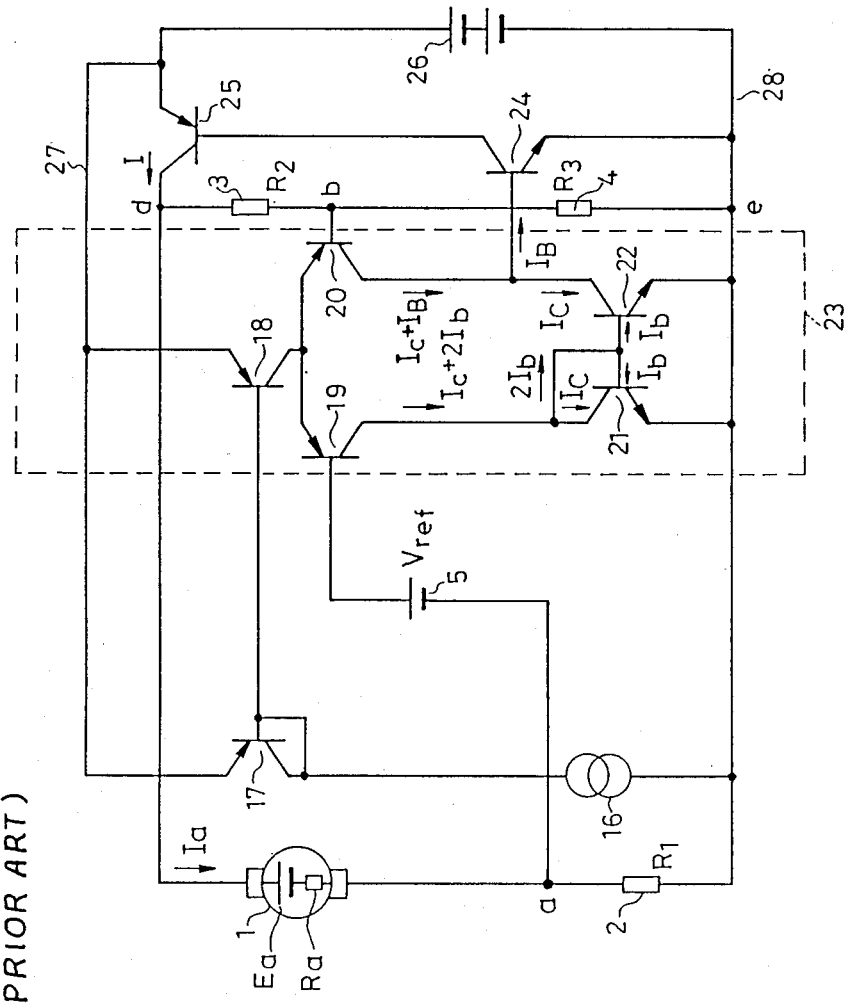
FIG. 3 is the circuit diagram of the conventional speed control apparatus for a DC motor.
Figure 4:
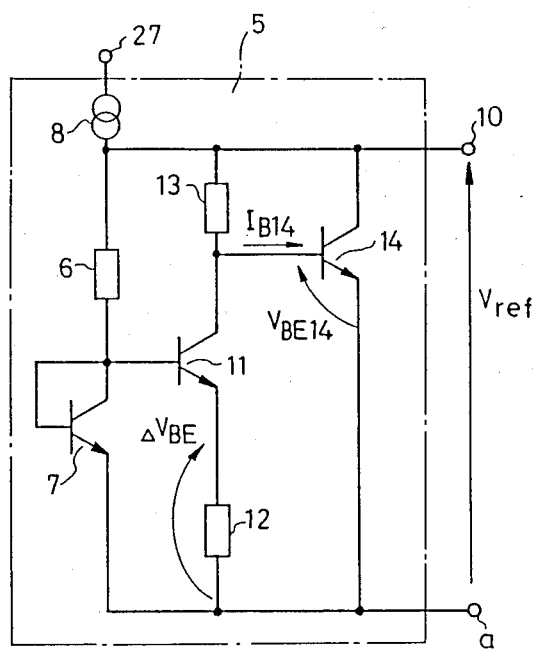
FIG. 4 is the circuit diagram of the reference voltage source circuit 5 of the conventional apparatus of FIG. 3.

Hereafter, a preferred embodiment of a speed control apparatus for a DC motor embodying the present invention is elucidated in detail with reference to FIG. 1 and FIG. 2. FIG. 1 is a circuit diagram of the speed control apparatus for a DC motor, wherein corresponding parts and components are designated with the same numerals as those of the circuit diagram of FIG. 3 showing the prior art. That is, the apparatus of FIG. 1 has a known bridge circuit consisting of a DC motor 1, a resistor 2, a resistor 3, and a resistor 4, wherein across the voltage-feeding points "d" and "e" a voltage from a battery 97 is impressed through a current controlling transistor 25, and the junction points "a" and "b" are voltage detection points of the bridge circuit. A first constant voltage generating circuit 63 is connected by its one end to the voltage detection point "a", and by its other output end to a non-inverting input terminal 98 of an operational amplifier 66. The output terminal 100 of the operational amplifier 66 is connected to an inverting input terminal 99 of the operational amplifier 66, and a voltage divider consisting of two resistors 64 and 65 is connected between the output terminal 100 and the voltage detection point "a" and a divided-voltage terminal, which is the junction point between the resistors 64 and 65, is connected to a first input terminal of a differential amplifier 91. And the voltage detection point "b" is connected to the other input terminal of the differential amplifier 91. In the first constant voltage generating circuit 63, the base of a first transistor 31 of npn type is connected to the collector thereof and also to the collector of a first current supply transistor 32 of pnp type. The emitter of the transistor 32 is connected through a resistor 33 to a positive voltage supply line 35. The emitter of the first transistor 31 is connected to a negative voltage supply line 36, which is connected to the voltage detection point "a". In the above-mentioned circuit constitution a block 34 comprising the first current supply transistor 32 and the resistor 33 constitutes a first current supply circuit for supplying a current to the first transistor 31. The base of a second transistor 37 of npn type is connected to the base of the first transistor 31, and the emitter of the second transistor 37 is connected through a resistor 41 to the negative voltage supply line 36, and the collector thereof is connected to the collector of a second current supply transistor 38 of pnp type, and further to the emitter of a third transistor 44 of pnp type whose collector is grounded and whose base is connected to the negative voltage supply line 36. The base of the second current supply transistor 38 of pnp type is connected to the base of the first current supply transistor 32 and the emitter of the second current supply transistor 38 is connected through a resistor 39 to the positive voltage supply line 35. Here, a block 40 comprising the resistor 39 and the second current supply transistor 38 constitutes a second current supply means for supplying current to the second transistor 37. A voltage dividing circuit comprising series connected resistors 43 and 42 is connected across the base and the emitter of the second transistor 37 and the divided-voltage terminal 45, i.e., the junction point between two resistors 43 and 42 is connected, as the output terminal of the first constant voltage generating circuit 63, to the non-inverting input terminal 98 of the operational amplifier 66. The base of an emitter-grounded fourth transistor 46 of npn type is connected to the collector of a transistor 57 of pnp type and further to the bases of a fifth transistor 49 of npn type and transistors 55, 67 and 77 of npn type. The collector of the fourth transistor 46 is connected through a resistor 47 to the base of the fifth transistor 49 and to the base of a collector-grounded transistor 48 of pnp type, whose emitter is connected to the base of the transistor 49. Emitters and collectors of the fifth transistor 49 and a transistor 51 of npn type are connected in common and the emitters are connected through a resistor 50 to the ground, and the collectors are connected to common connected collector and base of a transistor 59 of pnp type. The common connected base and collector of the transistor 59 is further connected to the bases of the transistors 32, 38 and 57, and the emitter of the transistor 57 is connected through a resistor 58 to the positive voltage supply line 35, and the emitter of the transistor 59 is connected through a resistor 60 to the positive voltage supply line 35. Thus, the transistors 32, 38, 57 and 59 together constitute a current mirror circuit wherein current flowing through the transistor 59 serves as a reference current. The base of the transistor 51 is connected through a resistor 52 to the positive voltage supply line 35 and to the collector of an emitter-grounded transistor 53 of npn type. The base of the transistor 53 is grounded through a resistor 54, and also is connected to the collector of a transistor 61 of pnp type, whose emitter is connected to the positive voltage supply line 35. The base of the transistor 61 is connected to common connected base and collector of a transistor 62 of pnp type, whose emitter is connected to the positive voltage supply line 35. The collector of the transistor 55 is connected to the common connected base and the collector of the transistor 62 and the emitter of the transistor 55 is grounded through a resistor 56. The operational amplifier 66 together with the voltage dividing resistors 64 and 65 constitute a voltage follower as a buffer between the output terminal 45 of the first constant voltage generating circuit 63 and the aforementioned one input terminal of the differential amplifier 91. The emitter of the aforementioned transistor 67 is grounded and the collector thereof is connected to the common connected base and collector of a transistor 68 of pnp type and also connected to the base of a transistor 69 of pnp type which is constituted by parallel connection of plural transistors. The emitters of the transistors 68 and 69 are both connected to the positive voltage supply line 35. The collector of the transistor 69 is connected to the output terminal 76 of a second constant voltage generating circuit 75, wherein the transistor 69 constitutes a sixth current supply means. The emitter of a collector-grounded transistor 70 of pnp type is connected to the output terminal 76 and the base of the transistor 70 is connected through a resistor 71 to the output terminal 76, and to the collector of a transistor 72 of npn type. The emitter of the transistor 72 is grounded and the base thereof is connected through a fourth resistor 73 to the output terminal 76 and also grounded through a third resistor 74. The collector of the transistor 77 is connected to the common connected base and collector of a transistor 78 of pnp type, and the emitter of the transistor 77 is grounded. The emitter of the transistor 78 is connected to the positive voltage supply line 35. A transistor 79 of pnp type is connected by its base to the common connected base and collector of the transistor 78 and further connected by its emitter to the positive voltage supply line 35 and further connected by its collector to common connected base and collector of a transistor 83 of npn type and to the bases of transistors 84 and 85 of npn type. The emitters of the transistors 83, 84 and 85 are all grounded. The base of a transistor 80 of pnp type is connected to common connected base and collector of the transistor 78 and the base of the transistor 79. The emitter of the transistor 80 is connected to the positive voltage supply line 35. The transistor 80 constitutes a third current feeding means in the differential amplifier 91. The collector of the transistor 80 is connected to common connected emitters of a sixth transistor 81 of pnp type and a seventh transistor 82 of pnp type, which together constitute a differential transistors pair. The base of the transistor 81 is connected to the junction point between the resistors 64 and 65 as already stated and constitutes the first input of the differential amplifier 91. The collector of the transistor 81 is connected to the collector of the transistor 84, and the collector of the transistor 82 is connected to the collector of the transistor 85. The transistors 84 and 85 constitute a fourth and a fifth current feeding means respectively. Common connected base and collector of an eighth transistor 86 of pnp type is connected to the base of a ninth transistor 87 of pnp type and the common connected base and collector of the transistor 86 are connected to the common connected collectors of the transistors 82 and 85. The collector of the transistor 87 is connected to the common connected collectors of the transistors 81 and 84. Common connected base and collector of a tenth transistor 88 of pnp type are connected to the base of an eleventh transistor 89 of pnp type and further to the common connected collectors of the transistors 81, 84 and 87. The emitters of the transistors 86, 87, 88 and 89 are connected to the output terminal 76 of the second constant voltage generating circuit 75, which is constituted by transistors 68, 69, 70, 72, resistors 71, 73 and 74. The transistors 86, 87, 88 and 89 together constitute a current subtraction circuit 90. The differential amplifier 91 comprises the transistors 80, 81, 82, 84, 85 and the current subtraction circuit 90. The collector of the transistor 89 is connected to the common connected base and collector of a transistor 92 of npn type and further to the base of a transistor 93 of npn type. The emitters of the transistors 92 and 93 are grounded. A transistor 94 of pnp type is connected by its emitter to the positive voltage supply line 35, by its base to the collector of the transistor 93 and by its collector to the base of a transistor 96 of npn type and to a resistor 95 whose other end is grounded. The transistor 96 is grounded by its emitter and connected by its collector to the base of the current controlling transistor 25 of pnp type which is connected between the positive end of the power source 97 and the positive feeding point "d" of the bridge circuit.

The operation of the above-mentioned embodiment of the speed control apparatus is elucidated in detail as follows. First, operation of the first constant voltage generating means 63 is described. The transistors 32 and 38 constitute a current mirror circuit together with the transistor 59, accordingly currents, which correspond to the current flow in the transistor 59, flow in the transistors 32 and 38. The emitter area of the transistor 37 is selected greater than that of the transistor 31, and therefore the emitter current density of the transistor 37 is smaller than that of the transistor 31, and accordingly a voltage difference $\Delta V_{BE}$ between the base-emitter voltages of the transistors 31 and 37 appears across the resistor 41. Since the voltage dividing circuit consisting of the resistors 43 and 42 is connected between the base and the emitter of the transistor 37, the output voltage of the reference voltage between the output terminal 45 and the voltage detection point "a" is given as follows:

$$V_{REF} = \frac{R_{42}}{R_{42} + R_{43}} \cdot V_{BE37} + \Delta V_{BE}, \quad (9)$$

where, $R_{42}$ and $R_{43}$ are resistances of the resistors 42 and 43, and $V_{BE37}$ is the base-emitter voltage of the transistor 37.

Defining that q is charge of electron, k is Boltzman's constant, T is absolute temperature and $J_{31}$ and $J_{37}$ are emitter current densities of the transistors 31 and 37, the above-mentioned equation (9) is expressed as follows.

$$V_{REF} = \frac{R_{42}}{R_{42} + R_{43}} \cdot V_{BE37} + \frac{kT}{q} \ln \frac{J_{31}}{J_{37}}. \quad (10)$$

When the condition is $V_{BE37}=0.68$ V, $R_{42}=2$ K$\Omega$, $R_{43}=13$ K$\Omega$, $J_{31}/J_{37}=10$, T=293° K. (20° C.), from the equation (10) the reference voltage $V_{REF}$ is expressed as follows.

$$V_{REF} = \frac{2 \times 10^3}{(2+13) \times 10^3} \times 0.68 + \quad (11)$$

$$\frac{1.380 \times 10^{-23} \times 293}{1.602 \times 10^{-19}} \times \ln 10$$

$$= 0.149 \ (V).$$

Hereupon, operation of the transistor 44 is elucidated.

Since the emitter of the transistor 44 is connected to the collector of the transistor 37, and the base is connected to the voltage detection point "a", the collector potential of the transistor 37 is clamped by the base-emitter voltage of the transistor 44. Accordingly, even when the voltage $V_{CC}$ of the power source 97 rises, the collector potential of the transistor 37 does not change in a significant manner. In general, a transistor has an Early effect that even under a condition of a constant base current in its active region, when the collector-emitter voltage increases the collector current increases a little, and this effect becomes a reason for undesirable change of $V_{REF}$ due to the change of the power source voltage. However, in the above-mentioned embodiment, by means of operation of the transistor 44 the collector potential of the transistor 37 is clamped almost to the forward voltage of a diode similarly as in the transistor 31, and accordingly the transistors 31 and 37 operate in a well balanced state irrespective of change of ambient temperature and source voltage; and, furthermore, since the transistor 37 is hardly affected by the Early effect, the first constant voltage generating circuit 63 of this embodiment shows satisfactory characteristics as a voltage source.

Next, the operation of the first constant voltage generating circuit 63 is elucidated using experimental data. Under the condition that the currents flowing through the transistors 32 and 38 are respectively 100 $\mu$A, resistances of the resistors 33 and 39 are 500$\Omega$, then voltage drop across the resistors 33 and 39 are 0.05 V. Now when the saturation voltages of the transistors 32 and 38 are respectively about 0.2 V, and collector voltages of the transistors 31 and 37 are about 0.65 V, then the apparatus can output a stabilized voltage when the power source voltage is above 0.9 V. FIG. 2 shows measured characteristic of the circuit, wherein abscissa is graduated by the power source voltage $V_{CC}$ and ordinate is graduated by output voltage at the output terminal 45.

The change ratio of the output reference voltage $V_{REF}$ corresponding to the change of the ambient temperature is given by the following equation (12).

$$\frac{\Delta V_{REF}}{\Delta T} = \frac{R_{42}}{R_{42} + R_{43}} \cdot \frac{\Delta V_{BE37}}{\Delta T} + \frac{k}{q} \ln \frac{J_{31}}{J_{37}} \quad (12)$$

Accordingly, by offsetting the positive temperature coefficient in the second term of the right side of the equation (12) by the negative temperature coefficient of the first term, the temperature-compensated output reference voltage $V_{REF}$ is obtainable. And by adjusting the dividing ratio $$\frac{R_{42}}{R_{42} + R_{43}}$$

or current density in the second term, a desired temperature coefficient is selectable.

Furthermore in the embodiment, since the temperature coefficients of the constant currents flowing through the transistors 32 and 38 for supplying the current to the transistors 31 and 37, respectively, can be selected without any limitation by the output reference voltage $V_{REF}$, the temperature coefficient $$\frac{\Delta V_{REF}}{\Delta T}$$

and the output reference voltage $V_{REF}$ are independently selected with considerable freedom of selection.

Next, the reference current generating means which generates a reference current to the transistor 32 or 38 is elucidated. The transistor 49 is operating with smaller emitter current density than that of the transistor 46, and the difference of the base-emitter voltages of the transistors 46 and 49 is impressed as a voltage across the resistor 50. Accordingly, by defining the emitter current densities of the transistors 46 and 49 as $J_{46}$ and $J_{49}$, and the resistance of the resistor 50 as $R_{50}$ and a current flowing therethrough is $I_{50}$, the following equation holds:

$$I_{50} = \frac{1}{R_{50}} \cdot \frac{kT}{q} \ln \frac{J_{46}}{J_{49}}. \tag{13}$$

The current $I_{50}$ given by the equation (13) flows through the transistor 59, and that value becomes a reference current for the currents to flow through the transistors 32 and 38. The temperature coefficient of the reference current $I_{50}$ is derived as follows from the equation (13).

$$\frac{\Delta I_{50}}{\Delta T} = \frac{1}{R_{50}} \cdot \frac{k}{q} \cdot \ln \frac{J_{46}}{J_{49}} \cdot \left(1 - \frac{1}{R_{50}} \cdot \frac{\Delta R_{50}}{\Delta T} \cdot T \right). \tag{14}$$

Accordingly, by adjusting the resistance $R_{50}$ of the resistor 50 or areas of the emitter of the transistors 46 and 49, the temperature coefficient of the reference current $I_{50}$ can be an arbitrarily selectable. That is, arbitrary temperature coefficient is given to the reference current to flow through the transistors 32 or 38. And thereby, the temperature coefficient of the output voltage $V_{REF}$ of the first constant voltage generating circuit 63 can be adjusted.

The output voltage of the first constant voltage generating circuit 63, which has the above-mentioned feature, is input to the voltage follower constituted by the operational amplifier 66, and output of the voltage follower from the terminal 100 is divided by the dividing circuit consisting of the resistors 64 and 65, and the voltage across the resistor 65 is used as reference voltage to be given to the differential amplifier 91.

Next, the operation of the differential amplifier 91 and related parts thereto is elucidated. In the differential amplifier 91, when the collector currents of the transistors 81, 82, 84, 85 and 87 are $I_{81}$, $I_{82}$, $I_{84}$, $I_{85}$ and $I_{87}$, respectively, and collector current of the transistor 89 which is the output current of the differential amplifier 91 is $I_{89}$, the following equations hold:

$$I_{87} = I_{85} - I_{82} \tag{15}$$

$$I_{87} + I_{89} = I_{84} - I_{81} \tag{16}.$$

Then, from the equations (15) and (16), the following equation (17) holds:

$$I_{89} = (I_{82} - I_{81}) + (I_{84} - I_{85}) \tag{17}.$$

Hereupon, since the transistors 84 and 85 constitute a current mirror circuit, the currents flowing therethrough are equal each other, and therefore $I_{84} = I_{85}$. Accordingly, the following equation (18) holds.

$$I_{89} = I_{82} - I_{81} \tag{18}.$$

That is, instead of the conventional circuit shown in FIG. 3 wherein subtraction of both collector currents of the transistor pair 19, 20 of the differential amplifier 23 is made directly by the transistor pair 21, 22 which constitute current mirror circuit, in the embodiment of the present invention of FIG. 1, the subtraction is made firstly by subtracting each-other-equal bias currents $I_{84}$ and $I_{85}$ from the collector currents $I_{81}$ and $I_{82}$ of the transistor pair of the differential amplifier, and further subtracting the resultant value by the current mirror circuit consisting of the transistors 86 and 87. Thereby, the bias current $I_{84}$ and $I_{85}$ are offset each other, to produce output current $I_{89}$ which is a difference of both collector currents of the differential transistor pairs.

Voltages of principal points of the circuit at an ambient temperature of 20° C. is as follows. First, the output voltage of the second constant voltage generating circuit 75, that is, a voltage $V_{76}$ of the output line 76 is given by the following equation (19).

$$V_{76} = \frac{R_{73} + R_{74}}{R_{74}} \cdot V_{BE72}, \tag{19}$$

wherein $V_{BE72}$ is the base-emitter voltage of the transistor 72, and $R_{73}$ and $R_{74}$ are resistances of the resistors 73 and 74, respectively.

Accordingly, when $V_{BE72} = 0.68$ V, $R_{73} = 3$ kΩ, and $R_{74} = 20$ kΩ, then the value of the output voltage $V_{76}$ becomes $V_{76} = 0.78$ V.

In the current mirror circuit of the transistors 86 and 87 and in another current mirror circuit of the transistors 88 and 89 which together constitute the current subtraction circuit 90, the emitter areas of the transistors 86 and 87 are selected to be equal and the emitter areas of the transistors 88 and 89 are to be equal, and emitter area of the transistor 86 is selected to be larger than that of the transistor 88, and thereby emitter current densities of the transistors 86 and 88 are selected to be substantially equal each other, so that the emitter base voltage $V_{BE86}$ and $V_{BE88}$ of the transistors 86 and 88, respectively, become substantially equal.

When $V_{BE86}$ and $V_{BE88}$ are selected as $V_{BE86} = V_{BE88} = 0.55$ V, potentials of the common connected collectors of the transistors 81 and 84 and common connected collectors of the transistors 82 and 85 become substantially equal to 0.23 V, and the transistors 84 and 85 can operate when the collector current is about 20 µA or more. Provided that the input voltages of both input terminals of the transistor pairs in the differential amplifier is very small, the potential of the common connected emitters of the transistors 81 and 82 are almost equal to the base emitter voltage (about 0.65 V). Accordingly, emitter collector voltages of the transistors 81 and 82 become about 0.42 V. Therefore, when the collector current of the transistor 80 is about 20 A or more, the circuit can operate sufficiently stable. Besides, as mentioned above, the potential of the common connected collectors of the transistors 81 and 84 and the common connected collectors of the transistors 82 and 85 are almost equal to each other, and the emitter-base voltages and the emitter-collector voltages of the transistors 81 and 82 are almost equal to each other, and therefore, the operation conditions of the above-mentioned two transistors become almost equal and the transistors 84 and 85 constituting the current mirror circuit have almost equal emitter-base voltages and collector-emitter voltages. As a result, the input offset voltage of the differential amplifier 91 becomes negligibly small in comparison with the reference voltage, and hence stable and satisfactory control as a function of ambient temperature change as well as source voltage change is realizable.

According to the above-mentioned constitution of the circuit, the speed control apparatus can operate even when the source voltage decreases to 1 V. For instance, when a minimum emitter-collector voltage to enable operation of the transistors in the active state is 0.15 V and the output voltage of the second constant voltage generating circuit 75 is 0.78 V, even in the case where the source voltage decreases to 1 V the whole transistors operate normally.

In the speed control apparatus for a DC motor embodying the present invention, the lower limit of the source voltage to enable normal operation is determined by circuit constitution of the second constant voltage generating circuit 75. When the output voltage $V_{76}$ of the second constant voltage generating circuit 76 is 0.78 V and emitter-collector saturation voltage of the transistor 69 is 0.15 V, the minimum limit of operable source voltage becomes 0.93 V. Therefore, even when a single dry battery is used as the power source, a practically satisfactory stable operation is provided until a considerable lowering of the dry battery voltage at its last stage of service time. Furthermore, base emitter voltage of the respective transistors have temperature coefficients of about $-2$ mV/°C., by providing negative temperature coefficient to the second constant voltage generating means 75 so as to compensate the effect of the above-mentioned temperature coefficients of the transistors. The above-mentioned stable operation for a wide range of source voltage is maintained not only in normal temperature, but also in change of the ambient temperature.

The temperature coefficient of the output voltage $V_{76}$ of the second constant voltage generating circuit 75 is obtained from the equation (19) as follows:

$$\frac{\Delta V_{76}}{\Delta T} = \frac{R_{73} + R_{74}}{R_{74}} \cdot \frac{\Delta V_{BE72}}{\Delta T}. \quad (20)$$

When operating condition is $R_{73} = 3$ KΩ, $R_{74} = 20$ KΩ and $$\frac{\Delta V_{BE72}}{\Delta T} = -2 \, mV/°C,$$

the temperature coefficient becomes $$\frac{\Delta V_{76}}{\Delta T} = -2.3 \, mV/°C.$$

Thus, temperature coefficients of the base-emitter voltages of the transistors can be substantially compensated, and hence the apparatus can operate stably and certainly for wide range of ambient temperature.

Furthermore, as the value of the output voltage $V_{76}$ of the second constant voltage generating circuit 75, about 0.78 V for the ambient temperature of 20° C. is optimum, and for the voltage of below 0.70 V the collector-emitter voltage of the transistors 84 and 85 becomes only 0.15 V, and the transistors 84 and 85 become saturated. On the other hand, if the output voltage $V_{76}$ is above 0.85 V, when the power source voltage decreases to 1 V, the emitter-collector voltage of the transistor 69 becomes only 0.15 V, thereby driving the transistor 69 to a saturated state, and hence feeding of constant current becomes impossible.

As has been described in detail on the preferred embodiment, as a result of constituting the circuit as defined by claim 1, the speed control apparatus for a DC motor can stably and certainly operate even when the power source voltage decreases as low as about 1 V, and the reference voltage circuit in the speed control apparatus has extremely small fluctuation of output voltage at the fluctuation of the power source voltage.

Furthermore, by providing a fifth transistor 49, which operates with a different emitter current density from that of the fourth transistor 46, and a second resistor 50, across which the difference of the base emitter voltages of the fourth and fifth transistors is impressed, and by providing a first current feeding circuit 34 and a second current feeding circuit 40 for feeding currents corresponding to the reference current flowing through the second resistor 50, the output reference voltage from the output terminal 45 and the temperature coefficient thereof can be independently selected with a considerable freedom.

Furthermore, by providing the fourth current feeding circuit 84 and the fifth current feeding circuit 85 respectively for transistor pairs 81, 82 and 86, 87 of the differential amplifier 91 and by connecting current subtraction circuit 90 to the connection points of the current feeding circuits 84, 85, respectively, and thereby amplifying the output of the current subtraction circuit 90 and feeding it back to the current feeding point "d", the apparatus can be operated even for such low power source voltage as 1 V. Therefore the differential amplifier 91 can be operated for very small input voltage, and its input offset voltage can be made very small. As a result, the speed control apparatus for a DC motor, which is capable of operating with stable rotation speed against fluctuation of power source voltage and change of ambient temperature, is realizable.

Furthermore, by providing the second constant voltage generating circuit 75 with negative temperature coefficient, negative temperature coefficient of the base-emitter voltage of the transistors constituting the apparatus can be compensated; and by selecting the output voltage of the second constant voltage generating means 75 between 0.70 V and 0.85 V, and particularly at about 0.78 V at ambient temperature of 20° C., the operation of the apparatus is stably controlled for wide range of ambient temperature.

As a conclusion, the speed control apparatus for a DC motor in accordance with the present invention is operable for the power source voltage of about 1 V, thereby enabling efficient utility of dry battery service life, and the operation is stable and certain against variation of the power source voltage and ambient temperature.

What is claimed is:
1. A speed control apparatus for a DC motor comprising:
   a bridge circuit including three resistive arms and another arm having a DC motor in-circuit there- with, said bridge circuit for generating a voltage proportional to the speed of rotation of the DC motor across voltage output points of said bridge circuit;

constant voltage generating means which comprises a first transistor which is connected by its collector and base to a first current feeding means and the emitter of said first transistor is connected to a first voltage output point, and a second transistor which is connected by its collector to a second current feeding means and has smaller emitter current densities than that of said first transistor and the emitter of said second transistor is connected through a first resistor to said first voltage output point operated with each other and having different respective emitter current densities, said constant voltage generating means providing a sum of a difference voltage between the base-emitter voltages of the first transistor and the second transistor and a voltage obtained by dividing the base-emitter voltage of the second transistor;

reference voltage generating means for generating a reference voltage as a function of the output of the constant voltage generating means;

a differential amplifier for providing a difference output for the voltage across the voltage output points and the reference voltage;

current control means for controlling current to be fed to the bridge circuit as a function of the voltage across the voltage output points and the reference voltage, thereby to control current of the DC motor in the bridge current;

reference current generating means for generating reference currents for controlling said first current feeding means and said second current feeding means;

means for summing a voltage difference between the base-emitter voltages of said first transistor and said second transistor and a voltage provided by dividing the base-emitter voltage of said second transistor; and a third transistor connected by its emitter to the collector of said second transistor and by its base to said first voltage output point.

2. A speed control apparatus for a DC motor in accordance with claim 1, wherein
said reference current generating means comprises
a fourth transistor, and
a fifth transistor having a different emitter current density from that of said fourth transistor and
a second resistor across which a difference of the base-emitter voltages of said fourth transistor and said fifth transistor is impressed, to control currents fed through said first current feeding means and said second current feeding means to correspond to current flowing through said second resistor.

3. A speed control apparatus for a DC motor comprising:
a bridge circuit including three resistive arms and another arm having a DC motor in circuit therewith, said bridge circuit for generating a voltage proportional to the speed of rotation of the DC motor across voltage output points of said bridge circuit;

reference voltage generating means for generating a reference voltage as a function of the output of a constant voltage generating means, a differential amplifier comprising
a differential transistor pair including a sixth transistor and seventh transistor, the emitters of which are common-connected to each other, third current feeding means connected between one voltage supply line and said common-connected emitters of said sixth transistor and said seventh transistor, a fourth current feeding means and a fifth current feeding means connected, respectively, to the collectors of said sixth and said seventh transistors, and current subtraction means connected, respectively, to the collectors of said differential pair of transistors;

current control means for controlling current to be fed to the bridge circuit as a function of the voltage across the voltage output points and the reference voltage by utilizing said differential transistor pair, thereby to control current of the DC motor in the bridge circuit, an eighth transistor connected by its base and collector to the collector of said seventh transistor, a ninth transistor connected by its base to the base of said eighth transistor and by its collector to the collector of said sixth transistor, a tenth transistor connected by its base and collector to the collector of said ninth collector, and an eleventh transistor connected by its base to the base of said tenth transistor, and by its collector to the output terminal of said subtraction circuit.

4. A speed control apparatus for a DC motor in accordance with claim 3, which further comprises:
a second constant voltage generating means for maintaining the emitters of the eighth, ninth, tenth and eleventh transistors at constant values.

5. A speed control apparatus for a DC motor in accordance with claim 4, wherein said second constant voltage generating means comprises
a sixth current feeding means connected between said one voltage supply line and a constant voltage output line,
a twelfth transistor, across the base and the emitter of which a third resistor is connected, and
a fourth resistor connected between constant voltage output supply line and the base of said twelfth transistor.

6. A speed control apparatus for a DC motor in accordance with claim 5, wherein output voltage of said second constant voltage generating means is selected to be between 0.70 V and 0.85 V at 20° C.

7. A speed control apparatus for a DC motor in accordance with claim 4, wherein
said second constant voltage generating means comprises
a sixth current feeding means connected between said one voltage supply line and a constant voltage output line,
a twelfth transistor, across the base and the emitter of which a third resistor is connected and
a fourth resistor connected between constant voltage output supply line and the base of said twelfth transistor.

8. A speed control apparatus for a DC motor in accordance with claim 7, wherein output voltage of said second constant voltage generating means is selected to be between 0.70 V and 0.85 V at 20° C.

9. A speed control apparatus for a DC motor in accordance with claim 7, wherein output voltage of said second constant voltage generating means is selected to be between 0.70 V and 0.85 V at 20° C.

10. A speed control apparatus for a DC motor in accordance with claim 3, wherein
the emitter area of said eighth transistor is selected larger than that of said tenth transistor.

11. A speed control apparatus for a DC motor in accordance with claim 3, wherein
the emitter current densities of said eighth and tenth transistors are selected substantially equal each other, and
the emitter-base voltages of said eighth and tenth transistors are selected substantially equal each other.

12. A speed control apparatus for a DC motor in accordance with claim 11, wherein said second constant voltage generator means comprises
a sixth current feeding means connected between said one voltage supply line and a constant voltage output line,
a twelfth transistor, across the base and the emitter of which a third resistor is connected, and
a fourth resistor connected between constant voltage output supply line and the base of said twelfth transistor.

13. A speed control apparatus for a DC motor in accordance with claim 3, wherein emitter area of said eighth transistor is selected larger than that of said tenth transistor.

14. A speed control apparatus for a DC motor in accordance with claim 13, wherein
emitter current densities of said eighth and tenth transistors are selected substantially equal each other,
emitter-base voltages of said eighth and tenth transistors are selected substantially equal each other.

15. A speed control apparatus for a DC motor in accordance with claim 14, which further comprises a second constant voltage generating means for maintaining the emitters of the eighth, ninth, tenth and eleventh transistors at constant values, and wherein said second constant voltage generating means comprises
a sixth current feeding means connected between said one voltage supply line and a constant voltage output line,
a twelfth transistor, across the base and the emitter of which a third resistor is connected, and
a fourth resistor connected between constant voltage output supply line and the base of said twelfth transistor.

16. A speed control apparatus for a DC motor in accordance with claim 15, wherein output voltage of said second constant voltage generating means is selected to be between 0.70 V and 0.85 V at 20° C.

17. A speed control apparatus for a DC motor in accordance with claim 13, which further comprises a second constant voltage generating means for maintaining the emitters of the eighth, ninth, tenth and eleventh transistors at constant values, and wherein said second constant voltage generating means comprises
a sixth current feeding means connected between said one voltage supply line and a constant voltage output line,
a twelfth transistor, across the base and the emitter of which a third resistor is connected, and
a fourth resistor connected between constant voltage output supply line and the base of said twelfth transistor.

18. A speed control apparatus for a DC motor in accordance with claim 17, wherein output voltage of said second constant voltage generating means is selected to be between 0.70 V and 0.85 V at 20° C.

* * * * *